Sept. 16, 1958  W R. FISHER  2,852,322
BRONZE AND STEEL COILED BEARING
Filed July 29, 1953  2 Sheets-Sheet 1

INVENTOR.
W. Reuen Fisher
BY
Thos. Donnelly
Attorney

Sept. 16, 1958     W R. FISHER     2,852,322
BRONZE AND STEEL COILED BEARING
Filed July 29, 1953     2 Sheets-Sheet 2

INVENTOR.
W. Reuen Fisher.
BY Thos. S. Connelly
Attorney

2,852,322

BRONZE AND STEEL COILED BEARING

W Reuen Fisher, North Branch, Mich.

Application July 29, 1953, Serial No. 370,930

6 Claims. (Cl. 308—237)

My invention relates to a new and useful improvement in a bearing or bushing adapted for use with rotating members such as shafts, arbors, and the like.

It is an object of the present invention to provide a bearing or bushing of this class embodying a tubular body formed from a spirally wound strip of wear-resisting metal, generally steel, which may be hardened, and having a liner therein consisting of a spirally wound tubular body formed from a strip of soft metal such as bronze, brass, or the like.

This liner of soft material serves to engage the rotating body, and being formed from brass, bronze or other materials well known for such use, will function as a bearing for a rotating body, and at the same time wear on the rotating body will not be effected.

Another object of the invention is to provide a bearing or bushing of this class so constructed and arranged that it is provided with a wear-resisting outer body and a liner or inner body of soft material so that when the bearing or bushing becomes worn, the liner of soft material may be easily and quickly removed and replaced.

Another object of the invention is the provision of a bearing or bushing so arranged and constructed that ease of lubrication throughout the length of the bearing or bushing may be effected.

Other objects will appear hereinafter.

It is recognized that various modifications and changes may be made in the detail of structure illustrated without departing from the invention, and it is intended that the present disclosure be considered to be but the preferred embodiment.

Forming a part of this application are drawings in which.

Figure 1:
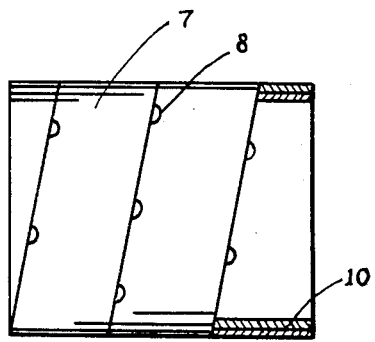
Fig. 1 is a side elevational view of the invention with parts broken away and parts shown in section.
Figure 2:
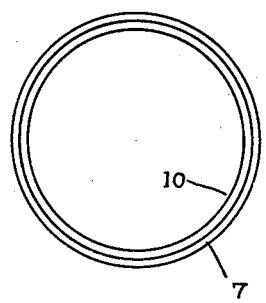
Fig. 2 is an end elevational view of the invention.
Figure 3:
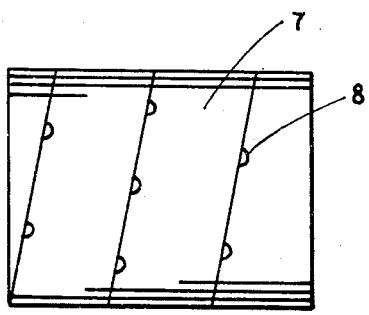
Fig. 3 is a side elevational view of the outer casing used in the invention.
Figure 4:
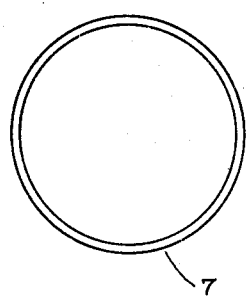
Fig. 4 is an end elevational view of Fig. 3.
Figure 5:
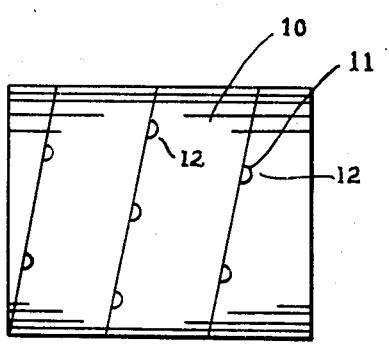
Fig. 5 is an elevational view of the inner body or liner used in the invention.
Figure 6:
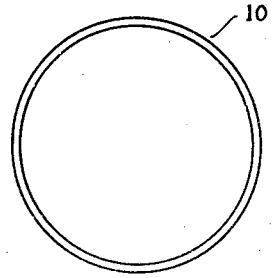
Fig. 6 is an end elevational view of the structure shown in Fig. 5.

The structure is a tubular body and comprises an outer casing or body 7 which is formed from a spirally wound strip of metal which may be hardened and which is wear-resistant. Formed in the edges of this body are the recesses or openings 8 which serve as oil transfer pockets or conduits which may transfer the oil to or receive the oil from the pockets or recesses 11 formed in the liner 10.

Positioned in the body 7 is a tubular body 10 formed from a soft metal such as bronze, brass or the like. This body 10 is formed from a spirally wound strip of this material and is provided with the openings 11 in which may be deposited a particle 12 of plastic material suitable for bearing purposes. The outer body 7 is spirally wound to a size to snugly receive the inner body 10 and when inserting the inner body 10 into the body 7, the body 10 would be coiled to a smaller diameter so that when inserted in the body 7 it would spring to its normal diameter and snugly engage at its periphery the inner surface of the enclosing casing or body 7.

When used as a bearing, the body 10 will of course engage the rotating shaft or arbor and, being formed from soft material, it will not damage this rotating shaft or arbor. When the body 10 becomes worn, it may be easily and quickly removed from the enclosing casing or outer body 7 by being coiled to reduce its diameter, whereupon it may be easily and quickly replaced with a new part.

Figure 7:
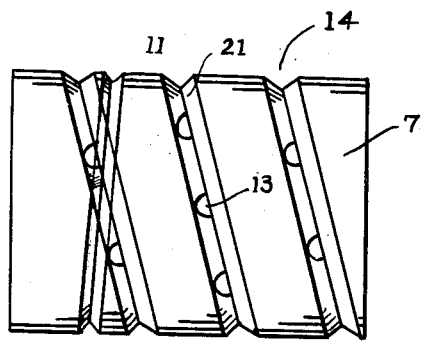
Fig. 7 is an elevational view of a tubular body used in the invention.
Figure 8:
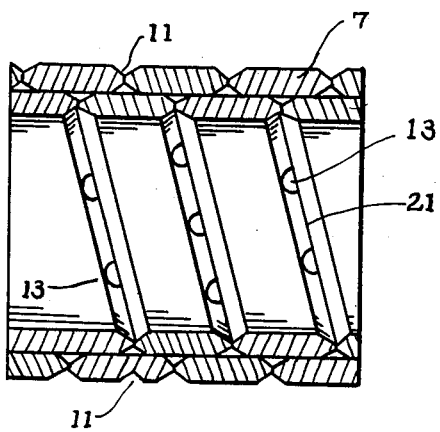
Fig. 8 is a central longitudinal sectional view of Fig. 7.

As shown in Fig. 7 and Fig. 8 there is formed in the tubular body which constitutes a strip of material spirally coiled, an annular groove 11 which may intersect the line 21 which is the meeting line between the spiral coils. In the adjacent edges may be formed the pockets 13. This annular groove 11 will constitute an oil conduit to conduct lubricant around the bearing or bushing and through its intersecting with the openings or pockets 13, this lubricant may provide a lubricating effect on the inside or the outside of the tubular body. This construction may be used when only a single tubular body is employed. The inner tubular body 10 may be used alone or the outer tubular body 7 may be used alone and in either case such tubular body may be provided with the circumferential groove 11. The edges of the spiral strips 7 and 10 are bevelled so that these bevelled edges provide a circumferential groove 14. This groove 14 also serves as an oil conduit.

In this way I have provided a bearing or bushing whereby the surface subjected to wear may be retained to a definite size because of being enclosed in the rigid, less yielding outer body or casing.

What I claim is:

1. A bearing of the class described, comprising: a tubular outer body formed from a spirally wound continuous strip of hardened wear-resisting material; and an inner tubular body positioned in said outer body and comprising a continuous strip of spirally wound metal of less wear-resisting qualities than said outer body and normally coiled, when inserted in said outer body, to an outside diameter less than its normal outside diameter before insertion in said outer body, and of sufficient resilient qualities to retain its periphery in snug engagement with the inner surface of said outer body, and said outer body having openings formed therein in which particles of plastic may be retained.

2. A bearing of the class described, comprising: a tubular outer body formed from a spirally wound continuous strip of hardened wear-resisting material; an inner tubular body positioned in said outer body and comprising a continuous strip of spirally wound metal of less wear-resisting qualities than said outer body and normally coiled, when inserted in said outer body, to an outside diameter less than its normal outside diameter before insertion in said outer body, and of sufficient resilient qualities to retain its periphery in snug engagement with the inner surface of said outer body, and said outer body having openings formed therein in which particles of plastic may be retained and in engagement with the periphery of said inner body.

3. A bearing of the class described, comprising: a tubular outer body formed from a spirally wound continuous strip of hardened wear-resisting material; and an inner tubular body positioned in said outer body and comprising a continuous strip of spirally wound metal of less wear-resisting qualities than said outer body and normally coiled, when inserted in said outer body, to an outside diameter less than its normal outside diameter before insertion in said outer body, and of sufficient resilient qualities to retain its periphery in snug engagement with the inner surface of said outer body, said outer body having openings formed therein in which particles of plastic may be retained and in engagement with the periphery of said inner body, and spaced apart openings formed in said innner body and a particle of plastic material retained in said openings and engaging the inner surface of said outer body and lying flush with the inner surface of said inner body.

4. A bearing of the class described, comprising: a tubular outer body formed from a spirally wound continuous flat strip of hardened wear-resisting material, the opposed edges of the windings being in engagement with each other and having a substantially smooth cylindrical inner surface; an inner tubular body positioned in said outer body and having a substantially smooth cylindrical outer surface and comprising a continuously flat strip of spirally wound metal of less wear-resisting qualities than said outer body and being normally coiled, when inserted in said outer body, to an outside diameter less than its normal outside diameter before insertion in said outer body, and of sufficient resilient qualities to retain its smooth outer surface in snug engagement with the smooth inner surface of said outer body and the opposed edges of the windings being in engagement with each other.

5. The invention as set forth in claim 4, wherein, said outer body is provided with openings therein in which particles of plastic are retained and in engagement with the periphery of said inner body.

6. The invention as set forth in claim 5, wherein, said inner body is provided with spaced apart openings therein in which particles of plastic material are retained and in engagement with the inner surface of said outer body and lying flush with the inner surface of said innner body.

References Cited in the file of this patent

UNITED STATES PATENTS

| | | |
|---|---|---|
| 378,978 | Ryan | March 6, 1888 |
| 640,059 | Whitney | Dec. 26, 1899 |
| 1,695,750 | Whiteley | Dec. 18, 1928 |
| 1,743,645 | Whiteley | Jan. 14, 1930 |
| 1,745,425 | Johnson | Feb. 4, 1930 |
| 1,746,981 | Anderson | Feb. 11, 1930 |
| 1,940,345 | Brownlee | Dec. 19, 1933 |
| 2,670,199 | Smith et al. | Feb. 23, 1954 |

FOREIGN PATENTS

| | | |
|---|---|---|
| 430,191 | Great Britain | June 14, 1935 |